(12) United States Patent
Malleni

(10) Patent No.: US 11,561,843 B2
(45) Date of Patent: Jan. 24, 2023

(54) AUTOMATED PERFORMANCE TUNING USING WORKLOAD PROFILING IN A DISTRIBUTED COMPUTING ENVIRONMENT

(71) Applicant: RED HAT, INC., Raleigh, NC (US)

(72) Inventor: Sai Sindhur Malleni, Marlborough, MA (US)

(73) Assignee: RED HAT, INC., Raleigh, NC (US)

( * ) Notice: Subject to any disclaimer, the term of this patent is extended or adjusted under 35 U.S.C. 154(b) by 246 days.

(21) Appl. No.: 16/898,832

(22) Filed: Jun. 11, 2020

(65) Prior Publication Data

US 2021/0389994 A1 Dec. 16, 2021

(51) Int. Cl.
*G06F 9/50* (2006.01)
*G06F 9/455* (2018.01)
*G06F 11/34* (2006.01)
*G06F 9/445* (2018.01)

(52) U.S. Cl.
CPC ........ *G06F 9/5083* (2013.01); *G06F 9/44505* (2013.01); *G06F 9/45558* (2013.01); *G06F 9/5027* (2013.01); *G06F 11/3466* (2013.01); *G06F 2009/4557* (2013.01); *G06F 2009/45595* (2013.01)

(58) Field of Classification Search
CPC .............. G06F 9/5083; G06F 9/44505; G06F 9/45558; G06F 9/5027; G06F 11/3466; G06F 2009/4557; G06F 2009/45595
See application file for complete search history.

(56) References Cited

U.S. PATENT DOCUMENTS

| | | | |
|---|---|---|---|
| 8,335,935 B2 | 12/2012 | Thomas et al. | |
| 9,146,721 B1* | 9/2015 | Nagaraja | G06F 9/5077 |
| 9,417,891 B2* | 8/2016 | Beveridge | G06F 9/452 |
| 9,772,886 B2 | 9/2017 | Cherkasov et al. | |
| 9,800,466 B1* | 10/2017 | Rangole | G06F 11/3452 |
| 10,127,146 B2 | 11/2018 | Moretto et al. | |

(Continued)

OTHER PUBLICATIONS

Alipourfard, O., et al., "CherryPick: Adaptively Unearthing the Best Cloud Configurations for Big Data Analytics," Yale University; Microsoft Research; University of California; Alibaba Group, Mar. 27-29, 2019, https://www.usenix.org/system/files/conference/nsdi17/nsdi17-alipourfard.pdf.

(Continued)

*Primary Examiner* — Benjamin C Wu
(74) *Attorney, Agent, or Firm* — Kilpatrick Townsend & Stockton LLP

(57) ABSTRACT

Workload profiling can be used in a distributed computing environment for automatic performance tuning. For example, a computing device can receive a performance profile for a workload in a distributed computing environment. The performance profile can indicate resource usage by the workload in the distributed computing environment. The computing device can determine a performance bottleneck associated with the workload based on the resource usage specified in the performance profile. A tuning profile can be selected to reduce the performance bottleneck associate with the workload. The computing device can output a command to adjust one or more properties of the workload in accordance with the tuning profile to reduce the performance bottleneck associated with the workload.

18 Claims, 4 Drawing Sheets

(56) References Cited

U.S. PATENT DOCUMENTS

| | | | | |
|---|---|---|---|---|
| 10,379,894 | B1* | 8/2019 | Cruz Oliveira Queiros | H04L 63/08 |
| 10,481,955 | B2 | 11/2019 | Birke et al. | |
| 10,606,664 | B2 | 3/2020 | Sen Sarma et al. | |
| 2009/0240802 | A1* | 9/2009 | Shankar | H04L 41/0856 709/224 |
| 2014/0122546 | A1* | 5/2014 | Liao | G06F 9/5027 707/827 |
| 2014/0359269 | A1* | 12/2014 | Moen | G06F 9/445 713/2 |
| 2015/0370603 | A1* | 12/2015 | Fuller | G06F 9/5066 718/104 |
| 2017/0262314 | A1* | 9/2017 | Cui | G06F 9/50 |
| 2018/0113742 | A1* | 4/2018 | Chung | G06F 9/4881 |
| 2019/0065274 | A1* | 2/2019 | Chauhan | G06F 9/45558 |
| 2019/0068445 | A1* | 2/2019 | Chauhan | H04L 67/10 |
| 2019/0229992 | A1 | 7/2019 | Margoor et al. | |
| 2020/0259722 | A1* | 8/2020 | Kocberber | G06F 11/3409 |
| 2021/0377312 | A1* | 12/2021 | Biswas | G06F 21/57 |

OTHER PUBLICATIONS

Baughman, Matt, et al., "Profiling and Predicting Application Performance on the Cloud," Minerva Schools at KGI, San Francisco, USA; Data Science and Learning Division, Argonne National Laboratory, Argonne, IL, USA; Department of Computer Science, University of Chicago, USA; Globus, University of Chicago, Chicago, IL, USA; Cancer Science Institute of Singapore, National University of Singapore, 2018, https://www.researchgate.net/publication/329786437_Profiling_and_Predicting_Application_Performance_on_the_Cloud.

"Automatic tuning in Azure SQL Database," Microsoft, Mar. 30, 2020, https://docs.microsoft.com/en-us/azure/sql-database/sql-database-automatic-tuning.

Elnaffar, S., "A methodology for auto-recognizing DBMS workloads," IBM Canada Ltd., 2002, https://pdfs.semanticscholar.org/17c9/bd881f408095080192285b1416fc73c5d524.pdf.

* cited by examiner

AUTOMATED PERFORMANCE TUNING USING WORKLOAD PROFILING IN A DISTRIBUTED COMPUTING ENVIRONMENT

TECHNICAL FIELD

The present disclosure relates generally to performance tuning in a distributed computing environment. More specifically, but not by way of limitation, this disclosure relates to using workload profiling for automated performance tuning in a distributed computing environment.

BACKGROUND

Distributed computing environments have become increasingly popular for handling workloads. Examples of distributed computing environments can include data grids, cloud computing environments, and computing clusters. Distributed computing environments often deploy workloads such as software applications within virtual machines or containers, which can provide for improved isolation among the workloads. Virtual machines can function as virtual computer systems with their own central-processing unit (CPU), memory, network interfaces, and disk storage. Hypervisors can be used for the virtualization of hardware by managing and allocating resources of physical hardware to virtual environments. Hypervisors can deploy virtual machines as guests on a host operating system of a node in a distributed computing environment.

DETAILED DESCRIPTION

Figure 1:
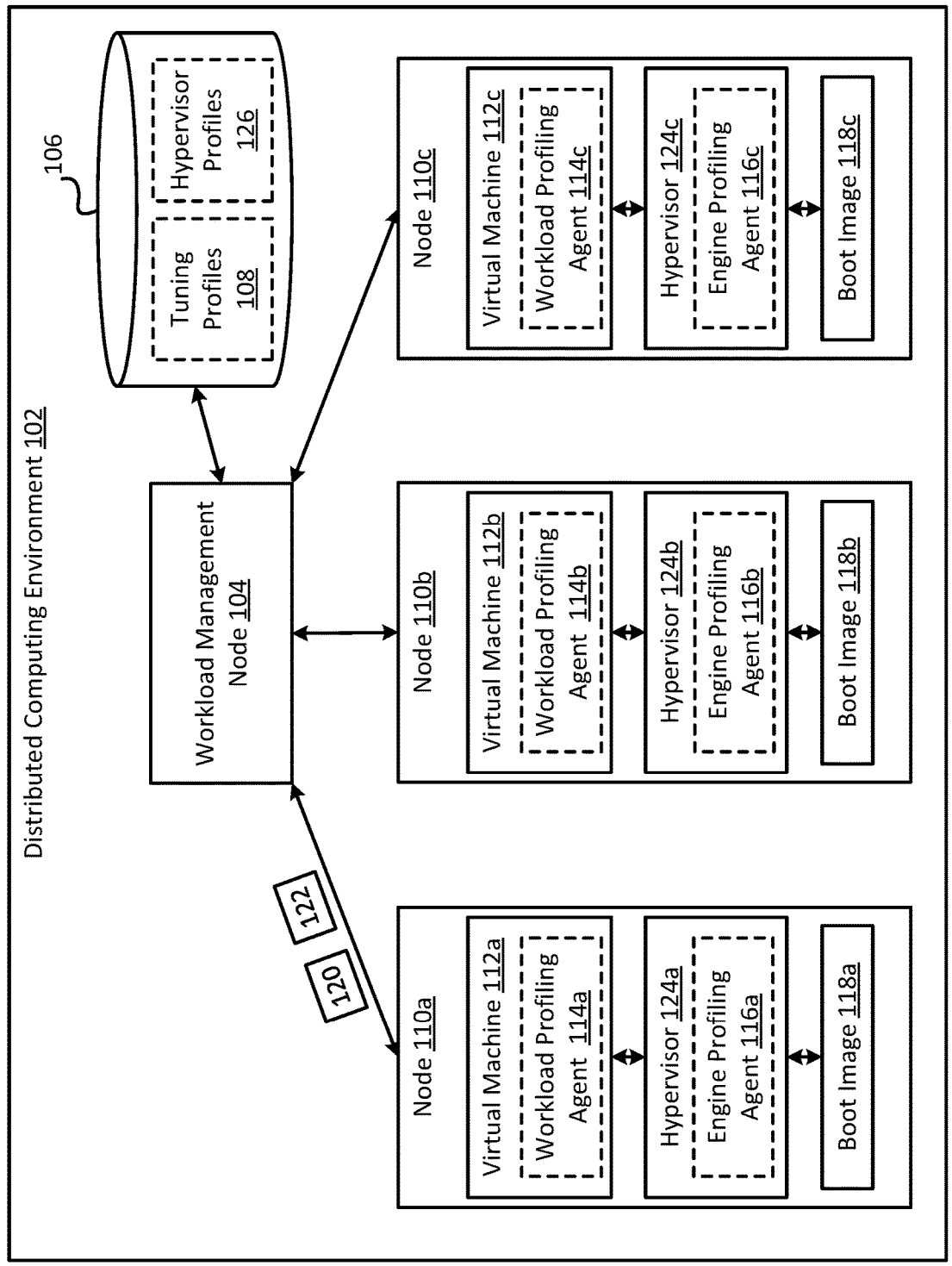
FIG. 1 is a block diagram of an example of a distributed computing environment for implementing automated performance tuning using workload profiling according to some aspects.

It can be challenging to optimize workload performance in distributed computing environments. For example, users may attempt to optimize workload performance by manually determining the resource consumption (e.g., memory, disk, network, and central-processing unit consumption) of each of the workloads and then manually tuning aspects of the distributed computing environment to meet the resource needs of the workloads. But this manual process is difficult. Although tools such as I/O stat exist to assist with determining workload performance, the information output by such tools is highly complex and usually requires a performance engineering expert to make sense of and use the information. Even assuming a user is sophisticated enough to make sense of this complex information, the user may then need to manually schedule the workloads on the appropriate nodes of the distributed computing environment having sufficient resources to meet requirements of the workloads. Or the user may need to tune aspects of the distributed computing environment to account for the workload's resource consumption. Not only is this challenging, time consuming, and complex, but regular users often lack sufficient privileges and control in the distributed computing environment to perform this type of scheduling and tuning.

Some examples of the present disclosure can overcome one or more of the abovementioned problems by automatically adjusting properties of workloads in a distributed computing environment based on performance profiles for the workloads to obtain the best performance for a workload. In one example, workload management software can receive a performance profile for a workload in a distributed computing environment, where the performance profile can indicate resource usage by the workload. The workload management software can determine a performance bottleneck associated with the workload based on the resource usage specified in the performance profile. A performance bottleneck can indicate an intensive resource requirement for the workload. The workload management software can then select a tuning profile and output a command to adjust one or more properties in accordance with the tuning profile to reduce the performance bottleneck associated with the workload.

In some examples of the present disclosure, the workload management software can run on one or more nodes of the distributed computing environment and serve as a centralized system that is in communication with agents running on one or more other nodes in the distributed computing environment. The node running the workload manager application can be referred to as a workload management node. The other nodes of the distributed computing environment can run software applications, or "agents," that gather resource-usage information about the workloads running on those nodes. These software agents can be referred to as workload profiling agents. The workload profiling agents can generate performance profiles for corresponding workloads based on the gathered resource-usage information, where the performance profiles can indicate whether the workloads are resource intensive (e.g., central-processing unit intensive, memory intensive, disk intensive, network intensive, or any combination of these). The workload profiling agents can then transmit the performance profiles to the workload management node, for example using a messaging layer.

In some examples, the workload profiling agents can be deployed alongside the workloads in virtual machines or containers. Deploying the workload profiling agents inside the same virtual machines or containers that are running the workloads can enable the workload profiling agents to collect the resource-usage information about the workloads. To simplify the process of deploying the workload profiling agents in the virtual machines or container, the program code for the workload profiling agents can be incorporated into the images (e.g., boot images) used to deploy the virtual machines or containers, in some examples. That way, when a hypervisor deploys a virtual machine or container from an image, a corresponding workload profiling agent is also automatically deployed therein.

In some examples, the nodes can also have additional software agents configured to obtain performance characteristics about the engines (e.g., hypervisors) used to deploy the virtual machines or containers. These software agents can be referred to as engine profiling agents. The performance characteristics can include processing unit usage, memory usage, network usage, and disk usage. The engine profiling agents can also determine information about the hardware and software capabilities of each engine including the amount of memory available, the number of processing units, and the models of the processing units associated with the engine. The engine profiling agents can transmit the performance characteristics, software characteristics, and/or hardware characteristics about the engines to the workload management node, which can store some or all of this information about each engine in a database. In this way, a database can be generated having performance, software, and hardware characteristics for some or all of the engines running in the distributed computing environment.

The workload management node can receive the performance profiles from the workload profiling agents and identify a performance bottleneck for a workload based on the corresponding performance profile. The workload management node can then determine which tuning profile, among a set of predefined tuning profiles, can counteract the performance bottleneck associated with the workload. The workload management node can make the determination based on the performance profile for the workload, the performance characteristics of the engine used to deploy the workload, or both of these. The tuning profile can also be selected based on the workload needing certain performance characteristics, such as low latency, high throughput, and high performance.

After determining the proper tuning profile, the workload management node can transmit one or more commands configured to implement the adjustments expressed in the tuning profile. For example, the workload management node can make application programming interface (API) calls configured to cause the workload profiling agent or the engine profiling agent associated with the workload to implement the adjustments expressed in the tuning profile, and thereby reduce the performance bottleneck associated with the workload.

In some examples, the workload management node may determine that the engine associated with the workload is incapable of meeting the resource needs of the workload. The workload management node can make this determination by accessing the database storing each engine's characteristics. Based on the engine being unable to meet the workload's resource needs, the workload management node can select an alternative engine that is capable of meeting the workload's requirements from the database. The workload management node can then determine another node in the distributed computing environment having that alternative engine, and migrate the workload to that node. This may result in better workload performance.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a distributed computing environment 102 for implementing automated performance tuning using workload profiling according to some aspects. The distributed computing environment 102 can include any number of nodes, such as servers or virtual machines. In this example, the distributed computing environment 102 includes a workload management node 104 and nodes 110a-c. At least some of the nodes 110a-c include hypervisors that can run virtual machines. For example, node 110a includes virtual machine 112a and hypervisor 124a, node 110b includes virtual machine 112b and hypervisor 124b, and node 110c includes virtual machine 112c and hypervisor 124c. The nodes 110a-c can also include boot images 118a-c for deploying the virtual machines. For example, node 110a includes boot image 118a, node 110b includes boot image 118b, and node 110c includes boot image 118c.

The nodes 110a-c can execute workloads, for example inside the virtual machines 112a-c. In some examples, the nodes 110a-c can also have workload profiling agents 114a-c for gathering information about the resource usage by the workload. The workload profiling agents 114a-c can be software applications that analyze the resource usage of the workloads executing in the virtual machines 112a-c. The resource usage can include memory usage, disk usage, processing unit usage, and network usage, or any combination of these. In one example, the resource usage can be received from virtual filesystem locations such as /proc and /sys for a Linux operating system. In the Linux operating system, the resource usage can be obtained using standard interface features including I/O stat for disk and central-processing unit information, Top for central-processing unit and memory information, and SAR for network information.

In some examples, the program code for the workload profiling agents 114a-c can be incorporated into the boot images 118a-c for deploying the virtual machines 112a-c on the node 110a. The hypervisors 124a-c can receive the boot images 118a-c and responsively deploy the workload profiling agents 114a-c within the virtual machines 112a-c on the node 110a-c. Each of the workload profiling agents 114a-c can generate a performance profile, such as performance profile 120, based on the resource usage of the workload running in the corresponding virtual machine 112a-c and transmit the performance profile over a network to the workload management node 104.

In some examples, the nodes 110a-c can also have engine profiling agents 116a-c. Each engine profiling agent 116a-c can be a software agent configured to analyze at least one performance characteristic of a corresponding hypervisor 124a-c and transmit the performance characteristic to the workload management node 104 over a network. The performance characteristic can include a memory-usage characteristic, a disk-usage characteristic, a central-processing unit-usage characteristic, and a network-usage characteristic, or any combination of these. In one example, the performance characteristics are stored in a virtual filesystem location. For a Linux operating system, examples of such filesystem locations are /proc and /sys. Additionally or alternatively, the engine profiling agents 116a-c can determine the software and hardware characteristics of the corresponding hypervisors 124a-c, such as their support for graphics processing units (GPUs) and their network card speeds, and transmit the software and hardware characteristics of the workload management node 104. In this way, the workload management node 104 can receive information about one or more performance characteristics 122, one or more software characteristics, and/or one or more hardware characteristics of hypervisor 124a from the engine profiling agent 116a.

The workload management node 104 can determine a performance bottleneck for a workload based on the performance profile 120 received from the corresponding workload profiling agent 114a. A performance bottleneck can indicate the workload is memory intensive, network intensive, central-processing unit intensive, or disk intensive, or any combination of these. Based on determining the performance bottleneck for the workload, the workload management node 104 can access a database 106 with tuning profiles 108. The tuning profiles 108 can be configured to counteract various types of performance bottlenecks, and may be pre-generated by an entity such as a system administrator or another user. The workload management node 104 can select a tuning profile based on the performance profile 120, the performance characteristic(s) 122 of the hypervisor 124a, or both of these. In response to selecting one of the tuning profiles 108, the workload management node 104 can then cause the adjustments expressed in the tuning profile to be implemented. For example, the workload management node 104 can make an application program interface call to the workload profiling agent 114a for causing the workload profiling agent 114a to make adjustments to the workload, adjustments to the virtual machine 112a in which the workload is executing, or both of these. In an alternative example, the workload management node 104 can communicate with the engine profiling agent 116a for causing the engine profiling agent 116a to make adjustments to the hypervisor 124a. Adjusting the workload, the virtual machine 112a in which the workload is executing, the hypervisor 124a, or any combination of these, may reduce the performance bottleneck of the workload.

Figure 4:
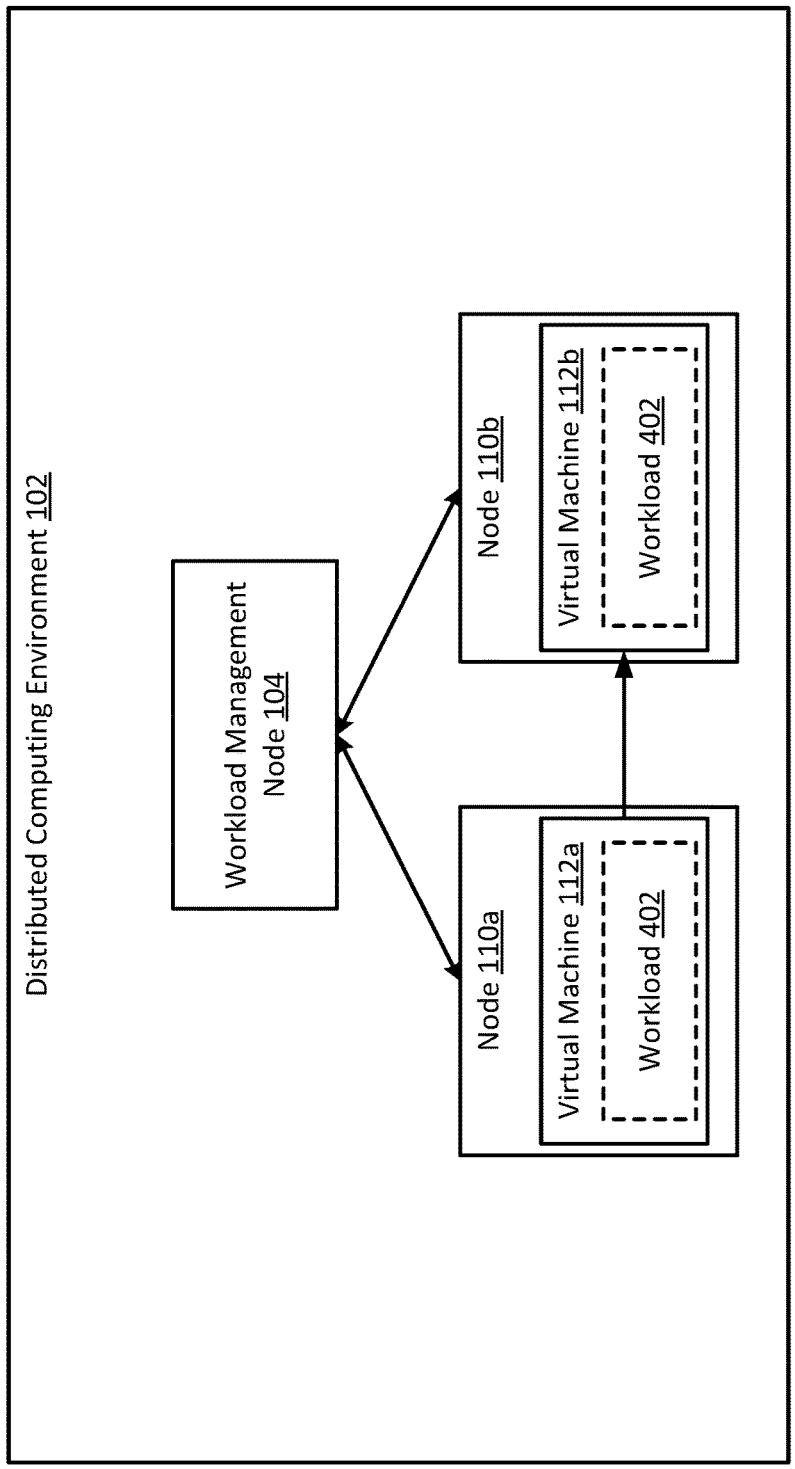
FIG. 4 is an example of migrating a workload between nodes according to some aspects.

In some examples, the workload management node can determine that the hypervisor 124a does not have performance characteristic(s) 122 to sufficiently support the resource usage of the workload. So, the workload management node 104 can identify which of the nodes includes a hypervisor capable of sufficiently supporting the resource usage of the workload. For example, the workload management node 104 can store the performance characteristics, software characteristics, and hardware characteristics of the hypervisors 124a-c determined by the engine profiling agents 116a-c as hypervisor profiles 126 in database 106. The workload management node 104 can then receive information about a hypervisor 124a. The workload management node 104 can access the hypervisor profiles 126 in database 106 to determine which of the hypervisor profiles 126 has the performance characteristic(s) 122, software characteristics, and/or hardware characteristics that can sufficiently support the resource usage of the workload. For example, the workload management node 104 can determine that hypervisor 124b on node 110b has sufficient memory, processing power, or disk space to execute the workload without the performance bottleneck. The workload management node 104 can then interact with the distributed computing environment 102 to migrate the workload to node 110b. An example of such migration is shown in FIG. 4, which depicts a simplified version of FIG. 1 in which a workload 402 is being migrated from virtual machine 112a on node 110a to the virtual machine 112b on node 110b, which may have sufficient support for the resource usage of the workload 402. In some examples, the workload management node 104 can make an application program interface call to migrate the workload 128 to the virtual machine 112b. In one particular example, the workload management node 104 can make application program interface calls to a cloud management system such as OpenStack or Amazon Web Services (AWS) in order to move the workload to the selected hypervisor.

While the example shown in FIG. 1 depicts a specific number and arrangement of components, other examples may include more components, fewer components, different components, or a different arrangement of the components shown in FIG. 1. For example, the database 106 may represent any number and combination of databases, which may or may not be included in the workload management node 104 or elsewhere in the distributed computing environment 102. And while FIG. 1 depicts virtual machines, hypervisors, and hypervisor profiles, other examples may involve containers, container-deployment engines such as Docker™, and container profiles.

Figure 2:
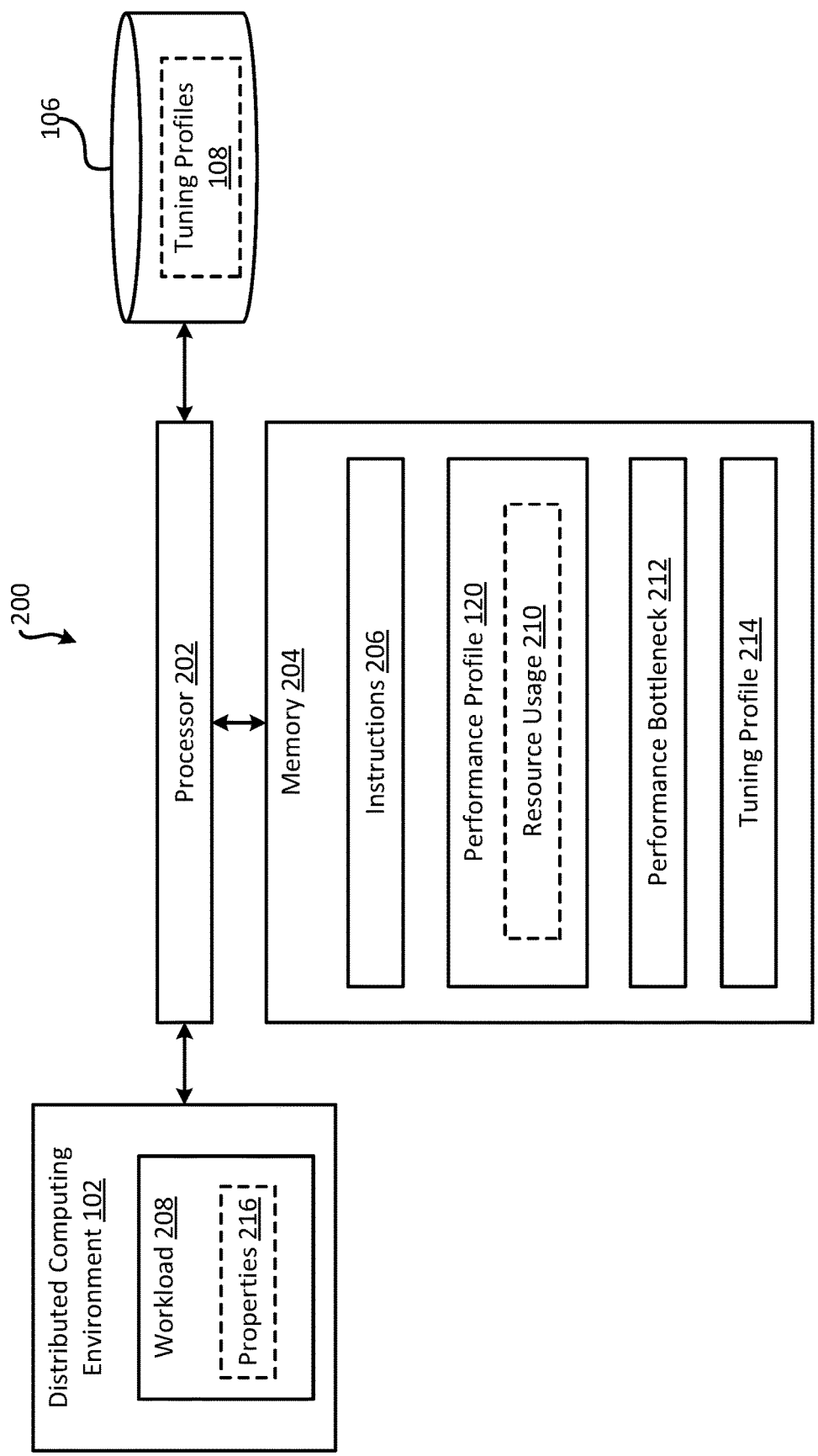
FIG. 2 is a block diagram of an example of a system for implementing automated performance tuning using workload profiling according to some aspects.

FIG. 2 is a block diagram of another example of a system 200 for implementing automated performance tuning using workload profiling in a distributed computing environment 102 according to some aspects. The system 200 includes a processor 202 communicatively coupled with a memory 204. In some examples, the processor 202 and the memory 204 can be part of a node, such as the workload management node 104 of FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C #, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. In some examples, at least some of the memory can include a medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

The distributed computing environment 102 includes a workload 208. In some examples, the processor 202 can execute instructions 206 to receive a performance profile 120 for the workload 208. The performance profile 120 can indicate resource usage 210 by the workload 208 in the distributed computing environment 102. The processor 202 can determine a performance bottleneck 212 associated with the workload 208 based on the resource usage 210 specified in the performance profile 120. In response, the processor 202 can select a tuning profile 214 configured to reduce the performance bottleneck 212 associated with the workload 208. The tuning profile 214 can be selected from a database 106 with tuning profiles 108 configured to reduce types of performance bottlenecks. The processor 202 can output one or more commands to adjust one or more properties 216 of the workload 208 in accordance with the tuning profile 214 to reduce the performance bottleneck 212 associated with the workload 208. This may improve the performance of the workload 208 running in the distributed computing environment 102.

Figure 3:
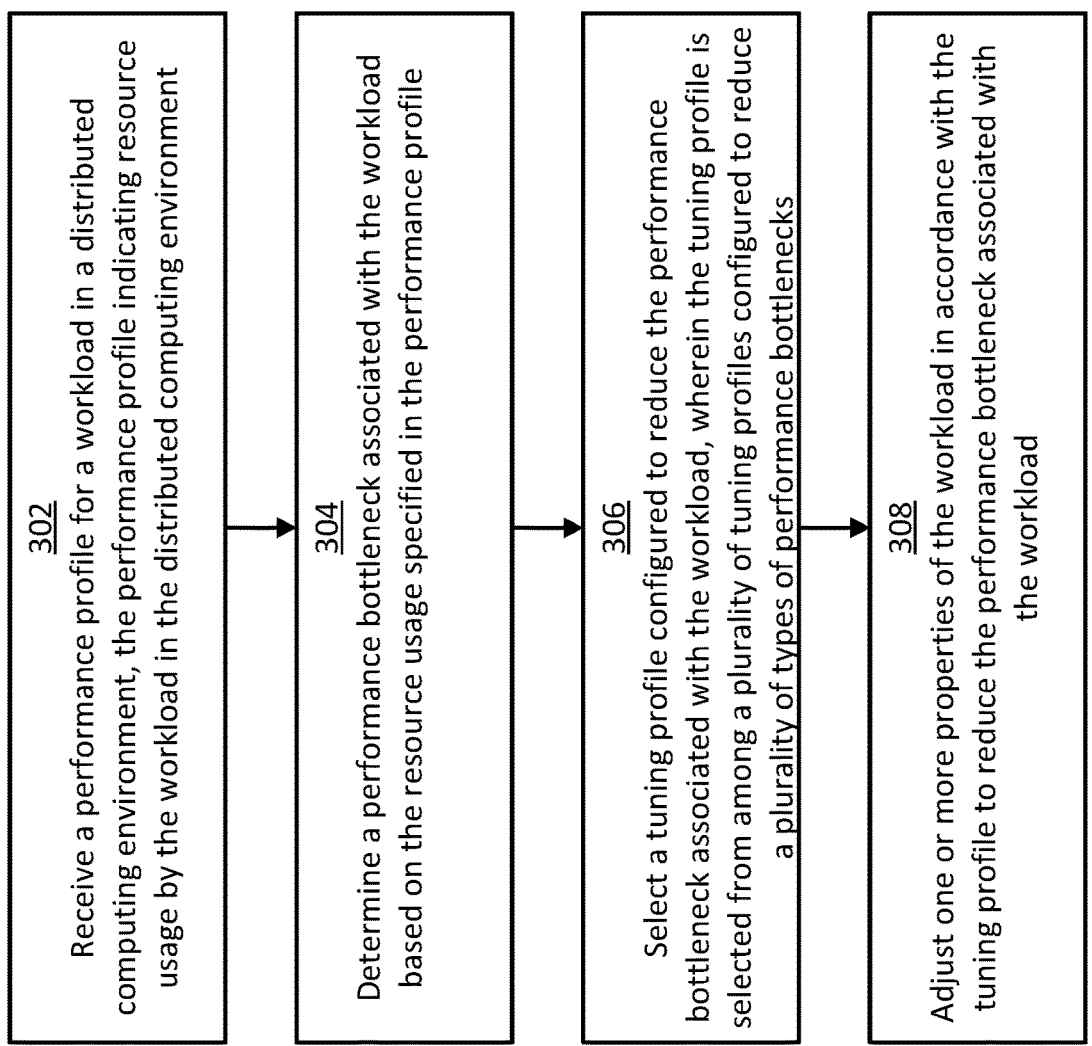
FIG. 3 is a flow chart of an example of a process for implementing automated performance tuning using workload profiling in a distributed computing environment according to some aspects.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, a processor 202 receives a performance profile 120 for a workload 208 in a distributed computing environment 102. The performance profile 120 can indicate resource usage 210 by the workload 208 in the distributed computing environment 102. The performance profile 120 can indicate memory usage, network usage, disk usage, or central-processing unit usage, or any combination of these.

In block 304, the processor 202 determines a performance bottleneck 212 associated with the workload 208 based on the resource usage 210 specified in the performance profile 120. For example, the processor 202 can determine that the workload's memory usage is high relative to its other resource usage, high relative to the memory usage of other workloads, and/or high relative to a predefined memory-usage value. As a result, the processor 202 can determine that there may be a memory bottleneck. The performance bottleneck 212 can indicate that the resource usage 210 that is intensive for the workload 208.

In block 306, the processor 202 can select a tuning profile 214 configured to reduce the performance bottleneck 212 associated with the workload 208. The tuning profile 214 can be selected from a database 106 of tuning profiles 108 configured to reduce different types of performance bottlenecks. In some examples, the processor 202 can select the tuning profile 214 based on one or more predefined performance constraints for the workload 208, such as low latency and high throughput. For example, a user may specify one or more performance constraints for the workload 208, such as a maximum amount of latency or a minimum amount of throughput. The processor 202 can select the tuning profile 214 that satisfies some or all of those performance constraints.

In block 308, the processor 202 can output a command to adjust the properties 216 of the workload 208 in accordance with the tuning profile 214, which may reduce the performance bottleneck 212 associated with the workload 208. Adjusting the properties 216 of the workload can involve the processor 202 communicating with one or more other components in the distributed computing environment 102, such as a workload profiling agent or an engine profiling agent associated with the workload. For example, the processor 202 can interact with an engine profiling agent associated with the workload to adjust characteristics of a virtual machine in which the workload 208 is deployed. In an alternative example, the processor 202 can initiate a migration process in which the workload 208 is migrated to a different node with sufficient computing resources to execute the workload and avoid the performance bottleneck 212.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a node of a distributed computing environment, wherein the node includes a hypervisor for deploying a virtual machine;
a processor; and
a memory including instructions that are executable by the processor for causing the processor to:
receive a performance profile for a workload in the distributed computing environment, the performance profile indicating a resource usage by the workload in the distributed computing environment, wherein the workload is associated with execution of the virtual machine;
determine a performance bottleneck associated with the workload based on the resource usage specified in the performance profile;
select a tuning profile configured to reduce the performance bottleneck associated with the workload, wherein the tuning profile is selected from among a plurality of tuning profiles configured to reduce a plurality of types of performance bottlenecks; and
output a command to adjust one or more properties of the workload in accordance with the tuning profile to reduce the performance bottleneck associated with the workload.

2. The system of claim 1, wherein the node includes a software agent configured to analyze the resource usage of the virtual machine, generate the performance profile based on the resource usage of the virtual machine, and transmit the performance profile over a network to the processor.

3. The system of claim 2, wherein program code for the software agent is incorporated into a boot image for deploying the virtual machine on the node, and wherein the hypervisor is configured to receive the boot image and responsively deploy the software agent and the virtual machine on the node.

4. The system of claim 1, wherein the resource usage includes memory usage, disk usage, processing-unit usage, and network usage.

5. The system of claim 1, wherein the node includes a software agent configured to analyze one or more characteristics of the hypervisor and transmit the one or more characteristics to the processor over a network, and wherein the memory further includes instructions that are executable by the processor for causing the processor to:
receive the one or more characteristics of the hypervisor from the software agent; and
select the tuning profile from among the plurality of tuning profiles based on the one or more characteristics of the hypervisor.

6. The system of claim 5, wherein the one or more characteristics include a performance characteristic, a software characteristic, or a hardware characteristic associated with the hypervisor.

7. The system of claim 1, wherein the node is a first node and the hypervisor is a first type of hypervisor, and wherein the one or more properties of the workload are adjusted by migrating the virtual machine to a second node in the distributed computing environment, the second node having a second type of hypervisor that is different from the first type of hypervisor and capable of counteracting the performance bottleneck.

8. The system of claim 7, wherein the memory further includes instructions that are executable by the processor for causing the processor to:
prior to receiving the performance profile for the workload:
receive a plurality of characteristics for a plurality of different types of hypervisors from a plurality of software agents running on a plurality of nodes in the distributed computing environment; and
store the plurality of characteristics corresponding to the plurality of different types of hypervisors in a database, the plurality of different types of hypervisors including the first type of hypervisor and the second type of hypervisor; and subsequent to receiving the performance profile for the workload:
  access the database to determine a set of characteristics that are correlated to the second type of hypervisor in the database;
  determine that the second type of hypervisor is capable of counteracting the performance bottleneck based on the set of characteristics;
  determine that the second node includes the second type of hypervisor; and
  in response to determining that the second node includes the second type of hypervisor, deploy the virtual machine on the second node using the second type of hypervisor to migrate the virtual machine to the second node.

9. The system of claim 1, wherein the plurality of tuning profiles are predefined prior to receiving the performance profile for the workload, and wherein the memory further includes instructions that are executable by the processor for causing the processor to:
  determine that the performance bottleneck associated with the workload is of a particular type; and
  select the tuning profile from among the plurality of tuning profiles based on the tuning profile being configured to reduce the particular type of performance bottleneck.

10. A method comprising:
  receiving, by a processor, a performance profile for a workload in a distributed computing environment, the performance profile indicating a resource usage by the workload in the distributed computing environment, the workload being associated with execution of a virtual machine on a node of the distributed computing environment, the node including a hypervisor for deploying the virtual machine;
  determining, by the processor, a performance bottleneck associated with the workload based on the resource usage specified in the performance profile;
  selecting, by the processor, a tuning profile configured to reduce the performance bottleneck associated with the workload, wherein the tuning profile is selected from among a plurality of tuning profiles configured to reduce a plurality of types of performance bottlenecks; and
  outputting, by the processor, a command to adjust one or more properties of the workload in accordance with the tuning profile to reduce the performance bottleneck associated with the workload.

11. The method of claim 10, wherein a software agent of the node is configured to analyze the resource usage of the virtual machine, generate the performance profile based on the resource usage, and transmit the performance profile over a network to the processor.

12. The method of claim 11, wherein program code for the software agent is incorporated into a boot image for deploying the virtual machine on the node, and wherein the hypervisor is configured to receive the boot image and responsively deploy the software agent and the virtual machine on the node.

13. The method of claim 10, wherein the resource usage includes memory usage, disk usage, processing-unit usage, and network usage.

14. The method of claim 10, wherein the node includes a software agent configured to analyze one or more performance characteristics of the hypervisor and transmit the one or more performance characteristics to the processor over a network, and further comprising:
  receiving the one or more performance characteristics of the hypervisor from the software agent; and
  selecting the tuning profile from among the plurality of tuning profiles based on the one or more performance characteristics of the hypervisor.

15. The method of claim 14, wherein the one or more performance characteristics include a memory-usage characteristic, a disk-usage characteristic, a processing-usage characteristic, and a network-usage characteristic associated with the hypervisor.

16. The method of claim 10, wherein the node is a first node and the hypervisor is a first type of hypervisor, and wherein the one or more properties of the workload are adjusted by migrating the virtual machine to a second node in the distributed computing environment, the second node having a second type of hypervisor that is different from the first type of hypervisor and capable of counteracting the performance bottleneck.

17. The method of claim 16, further comprising:
  prior to receiving the performance profile for the workload:
    receiving a plurality of performance characteristics for a plurality of different types of hypervisors from a plurality of software agents running on a plurality of nodes in the distributed computing environment; and
    storing the plurality of performance characteristics corresponding to the plurality of different types of hypervisors in a database, the plurality of different types of hypervisors including the first type of hypervisor and the second type of hypervisor; and
  subsequent to receiving the performance profile for the workload:
    accessing the database to determine a set of performance characteristics that are correlated to the second type of hypervisor in the database;
    determining that the second type of hypervisor is capable of counteracting the performance bottleneck based on the set of performance characteristics;
    determining that the second node includes the second type of hypervisor; and
    in response to determining that the second node includes the second type of hypervisor, deploying the virtual machine on the second node using the second type of hypervisor to migrate the virtual machine to the second node.

18. A non-transitory computer-readable medium comprising program code that is executable by a processor for causing the processor to:
  receive a performance profile for a workload in a distributed computing environment, the performance profile indicating a resource usage by the workload in the distributed computing environment, the workload being associated with execution of a virtual machine on a node of the distributed computing environment, the node including a hypervisor for deploying the virtual machine;
  determine a performance bottleneck associated with the workload based on the resource usage specified in the performance profile;
  select a tuning profile configured to reduce the performance bottleneck associated with the workload, wherein the tuning profile is selected from among a plurality of tuning profiles configured to reduce a plurality of types of performance bottlenecks; and output a command to adjust one or more properties of the workload in accordance with the tuning profile to reduce the performance bottleneck associated with the workload.

* * * * *